(12) United States Patent
Oosako et al.

(10) Patent No.: US 6,414,784 B1
(45) Date of Patent: Jul. 2, 2002

(54) CRYSTAL SUPPORT DEVICE

(75) Inventors: Yasu Oosako, Yokohama; Kyouichi Deki, Shizuoka-ken; Toshio Yokota, Kanagawa-ken; Naoki Kitatochi, Suntou-gun, all of (JP)

(73) Assignee: Kabushiki Kaisya Ushiosougougizyutsukenkyusyo, Tokyo (JP)

(*) Notice: Subject to any disclaimer, the term of this patent is extended or adjusted under 35 U.S.C. 154(b) by 0 days.

(21) Appl. No.: 09/537,714

(22) Filed: Mar. 30, 2000

(30) Foreign Application Priority Data

Mar. 30, 1999 (JP) .......................................... 11-087753

(51) Int. Cl.$^7$ ................................................ G02F 1/35
(52) U.S. Cl. ........................................ 359/326; 372/21
(58) Field of Search ............................. 359/326–332; 372/21–22

(56) References Cited

U.S. PATENT DOCUMENTS

| | | | |
|---|---|---|---|
| 3,947,688 A | * | 3/1976 | Massey .................. 359/326 X |
| 4,913,533 A | | 4/1990 | Kafka et al. .................. 359/328 |
| 4,968,121 A | | 11/1990 | Bruesselbach et al. ....... 359/328 |
| 5,093,832 A | * | 3/1992 | Bethune et al. ................ 372/21 |
| 5,353,292 A | | 10/1994 | Motegi ........................ 372/21 |
| 5,381,430 A | | 1/1995 | Nozaki et al. ................. 372/21 |
| 5,943,353 A | * | 8/1999 | Kaneko .................... 372/22 X |
| 6,002,697 A | * | 12/1999 | Govorkov et al. ........ 372/22 X |

FOREIGN PATENT DOCUMENTS

DE        24 36 623 A1        2/1976

* cited by examiner

*Primary Examiner*—John D. Lee
(74) *Attorney, Agent, or Firm*—Nixon Peabody LLP; David S. Safran (57) ABSTRACT

To prevent beam fluctuation produced when a nonlinear optical crystal is maintained at a high temperature, a beam passage component is provided at the beam entrance and exit sides of the nonlinear optical crystal beam of the crystal support device, and the temperature at the end of the beam passage component away from the crystal is controlled to within a range of difference from ambient temperature at which the beam will be stable.

8 Claims, 6 Drawing Sheets

— Holder only
— Quartz rod attached

CRYSTAL SUPPORT DEVICE

BACKGROUND OF THE INVENTION

1. Field of the Invention

This invention concerns a crystal support device to support nonlinear optical crystals that emit ultraviolet light. Specifically, it concerns a crystal support device that prevents beam fluctuations that arise when the crystal temperature is higher than room temperature.

2. Description of Related Art

In recent years there have been attempts to generate ultraviolet light through wavelength conversion using nonlinear optical crystals. A variety of crystals are known to be nonlinear crystals that can be used for such applications, including CLBO ($CaLiB_6O_{10}$), LBO ($LiB_3O_5$), BBO ($\beta$-$BaB_2O_4$), CBO and ($CaB_3O_5$).

Many of these nonlinear crystals are used by elevating the crystal temperature above the ambient temperature; these include LBO, CLBO, CBO, PPLN, KTP, LN crystals, and also KDP and KDP*P.

In applications run at an elevated crystal temperature, the air at the optical beam's entrance to and exit from the crystal support device comes in direct contact with the high-temperature crystal support device, which causes fluctuations in the density of the air and produces instability due to the continual changes in the index of refraction at the beam entrance and exit of the crystal support device.

Figure 10A:
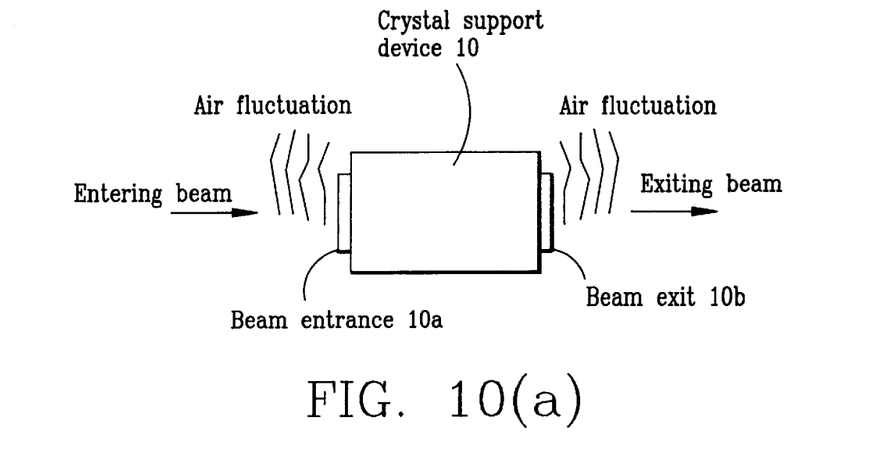
FIG. 10(a) is a drawing for use in explaining beam fluctuation where a beam enters and exits the crystal support device.
Figure 10B:
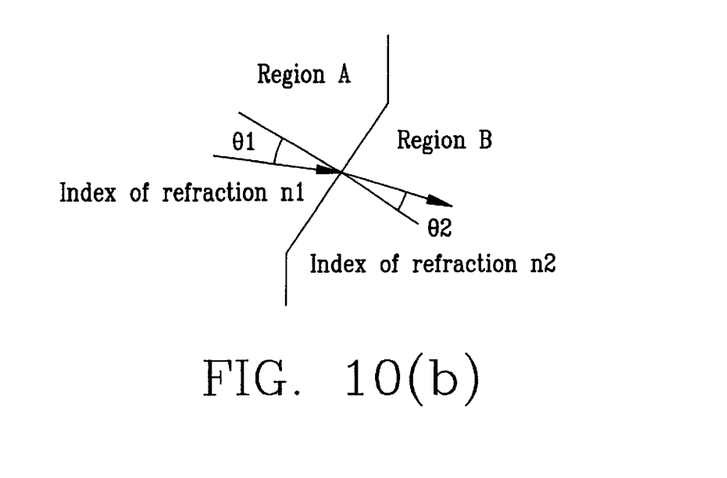
FIG. 10(b) is a diagram showing the change in the index of refraction of air formed near the beam entrance and beam exit.

As shown in FIG. 10(a), when the temperature of the beam entrance 10a and exit 10b of the crystal support device 10 is higher than the ambient temperature, fluctuations occur in the air nearby. Because the index of refraction of air varies with its temperature, regions of differing temperature are formed near the beam entrance 10a and exit 10b, and if domains in these regions fluctuate, there will be fluctuations in the laser beams entering and exiting the crystal support device 10. For example, if there is a 10° C. difference of temperature between region A and region B shown in FIG. 10b, it will produce a change in the index of refraction of air on the order of $10^{-5}$ at ultraviolet wavelengths. For that reason, the angle of incidence of a beam that enters region B from region A of FIG. 10b will be $\theta 1$ and the angle of departure to region B will be $\theta 2$. Taking the index of refraction in region A as n1 and the index of refraction in region B as n2, it comes to $\theta 2/\theta 1 = n1/n2 = 10^{-6}$. As an approximate calculation, the change of beam position arising from the difference in index of refraction will be about 10 $\mu$rad.

As stated above, beam fluctuation arises from what is called the air shimmer phenomenon in crystal support devices that are used by elevating the crystal temperature above room temperature. This change of beam position has not been a problem in equipment using lasers heretofore. In recent years, however, the increased power of ultraviolet lasers has been accompanied by the use of ultraviolet lasers for opening holes in precision-printed substrates for high-density mounting. This application requires processing to open holes with diameters of 10 $\mu$m, which means the precision of positioning is a few microns. The beam pointing stability required of the laser, converted to angular shift, is a few $\mu$rad.

Within the present market for wavelength conversion equipment and other laser equipment, there is much wavelength conversion equipment that is maintained at high temperatures, and it has not been possible to achieve the beam pointing stability required by this market.

SUMMARY OF THE INVENTION

In view of the foregoing, a primary object of the present invention is to reduce beam fluctuation between the entry and exit ends of crystal support devices that are used by elevating the crystal temperature above room temperature, and to respond to new market demands.

This object, to prevent beam fluctuation produced when a nonlinear optical crystal is maintained at a high temperature, is achieved in accordance with present invention which establishes a beam passage component at the beam entrance and exit sides of the nonlinear optical crystal beam of the crystal support device, and attempts to control the temperature at the end of the beam passage component away from the crystal within a range of difference from ambient temperature at which the beam will be stable.

A hollow passage component that will not produce a counterflow of air inside it, or a solid passage component of a material like quartz with high transparency to the wavelength of laser beams can be used as the beam passage component.

It is even more effective if the end of the beam passage component away from the crystal is cooled to a temperature close to the ambient temperature.

It was learned from experimentation that the beam fluctuation could be kept within a given value S (in $\mu$rad) by controlling the temperature difference T between the temperature of the beam passage component away from the crystal on the entering and exiting sides and the ambient temperature such that $T \leq 20 + 3.5S$.

A focusing lens is generally placed between the exit of the laser beam and the item to be treated by laser beam, and the amount of fluctuation of the beam on the surface of the item to be treated is a fraction of the amount of fluctuation at the exit of the laser beam exit. Accordingly, if there is a distance of 1 m between the exit of the laser beam and the item to be treated, when the amount of beam fluctuation at the exit of the laser beam exit is 5 $\mu$rad, there would be a 5 $\mu$m fluctuation on the surface of the item to be treated. However, since the focusing lens will reduce the amount of fluctuation on the surface to a fraction, the amount of fluctuation on the surface of the item to be treated may be 1 $\mu$m or less, and it will be possible to maintain the necessary precision of processing.

Now, it became clear through experimentation that the beam passage component would have to be set up on both the beam-entrance and beam-exit sides of the crystal. That is, if an optical item were placed just on the beam-exit side, the beam would fluctuate on the beam-entrance side, and so the beam pointing stability would deteriorate from that when the optical item were placed on both the beam-entrance and beam-exit sides.

If the beam passage component is a hollow tube, then of course the smaller its cross-sectional area, the more effectively the movement of air within the tube can be limited. Experimentation confirmed, however, that the effect was greatest if the maximum diameter of the hollow tube were no more than 3 times the length of the diagonal of the crystal. The reason for that is thought to be as follows. There is naturally convection in the flow of air within the hollow tube. Because one end of each hollow tube is connected to the crystal holder, air cannot flow in from the other end. Consequently, if the temperature at the opposite, open end is slightly lower, the speed of air flow within the hollow tube is extremely low. Accordingly, fluctuation of the index of refraction can be almost eliminated, and there is almost no positional shift of the beam passing through the hollow tube.

If the minimum value for the inside diameter of the beam passage component is 2 times the beam diameter, it can be assured that there will be no obstruction to passage of the laser beam. As used here, the beam diameter is the width $p/e^2$ (where e is the base of the natural logarithm: 2.71828), when the peak value of the energy distribution is p; here is, the energy distribution of the laser beam is a Gaussian distribution with $M^2=1$ (where $M^2$ is the parameter for evaluating the quality of the beam).

Now, if there is, around the gap between the end of the beam passage component that is near the crystal and the face of the crystal, a cover that covers the full circumference, it is possible to prevent the occurrence of beam fluctuation caused by convection within that gap. If there is a vacuum around the optical crystal and the space enclosed by the beam passage components, it is possible to reliably prevent beam fluctuation within the path comprising the optical crystal, the beam passage components and the hollow tube.

DETAILED DESCRIPTION OF THE INVENTION

Figure 1:
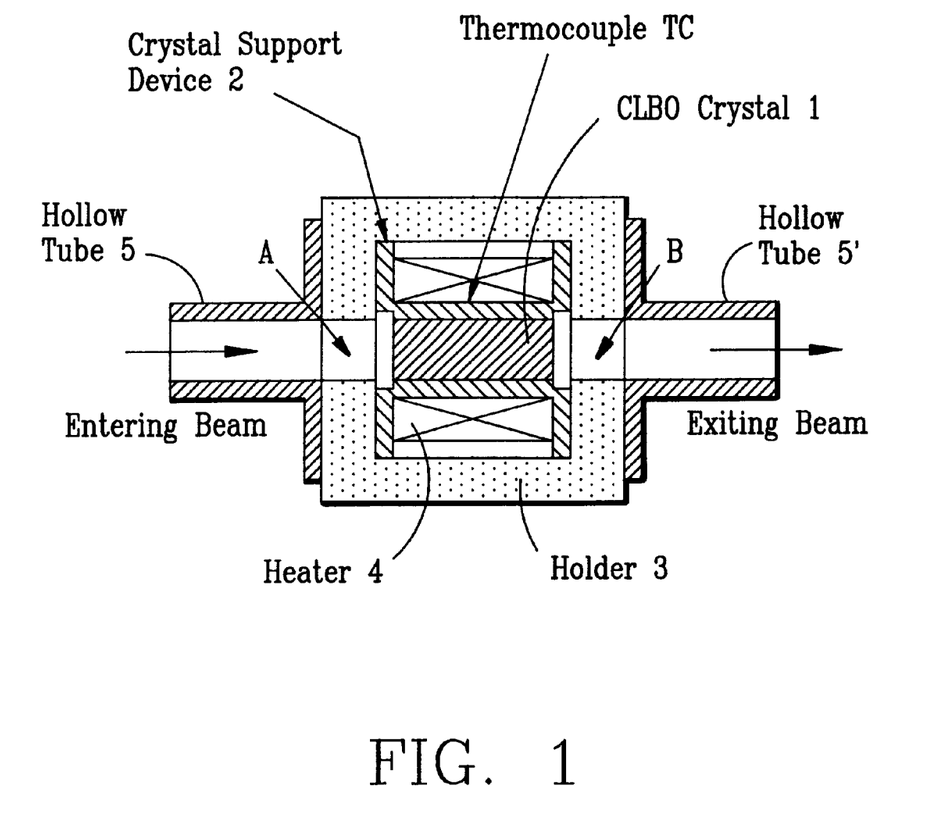
FIG. 1 is a cross-sectional view of the structure of one embodiment of the crystal support device of the invention.

FIG. 1 shows a cross section of the structure of one embodiment of the crystal support device of this invention which, in the following explanation, uses CLBO as the nonlinear crystal. However, this invention can be applied to support devices for a variety of crystals that are used by elevating the temperature of the crystal, including the above-mentioned LBO, CBO, PPLN, KTP, LN crystals, and also KDP and KDP*P nonlinear crystals, in addition to CLBO crystals.

In FIG. 1, a CLBO crystal 1 is set in a crystal supporter 2 that is formed of aluminum. The crystal supporter 2 has a heater 4, and a thermocouple TC which is attached to the heater 4 to measure and control the temperature. Moreover, the crystal supporter 2 is enclosed in a holder 3 that is formed of a ceramic. The crystal supporter 2 and the holder 3 are open to the two faces of the CLBO crystal 1 (openings A and B in the figure). To the two sides of the holder 3 are fitted hollow tubes 5, 5', which are beam passage components formed of copper, stainless steel (SUS), ceramics, quartz, glass or other materials. The hollow tubes 5, 5' are aligned with the openings A, B of the crystal supporter 2 and the holder 3.

The laser beam emitted from a laser source (not illustrated) enters one face of the CLBO crystal 1, after passing through the hollow tube 5 and the opening A in the crystal supporter 2 and the holder 3, and the beam exiting the other face of the CLBO crystal 1 is emitted to the outside through the opening B in the crystal supporter 2 and the holder 3, and through the hollow tube 5'.

In developing this invention, a number of experiments were conducted using a crystal support device constructed as described above to investigate beam pointing stability. First, the CLBO crystal was heated by the heater 4 to investigate the beam pointing stability (amount of fluctuation) both for the holder 3 with the hollow tubes 5, 5' attached and for the holder 3 alone (without the hollow tubes 5, 5' attached). The hollow tubes 5, 5' were made of various materials, including stainless steel (SUS) pipe (inside diameter 4.2 mm) and ceramic pipe (inside diameter 17.5 mm). The laser beam used here had a beam diameter of 1 mm (the e fluctuation mentioned above), and the faces of the CLBO crystal where the beam entered and exited measured about 8 mm high and about 7 mm wide.

Figure 2:
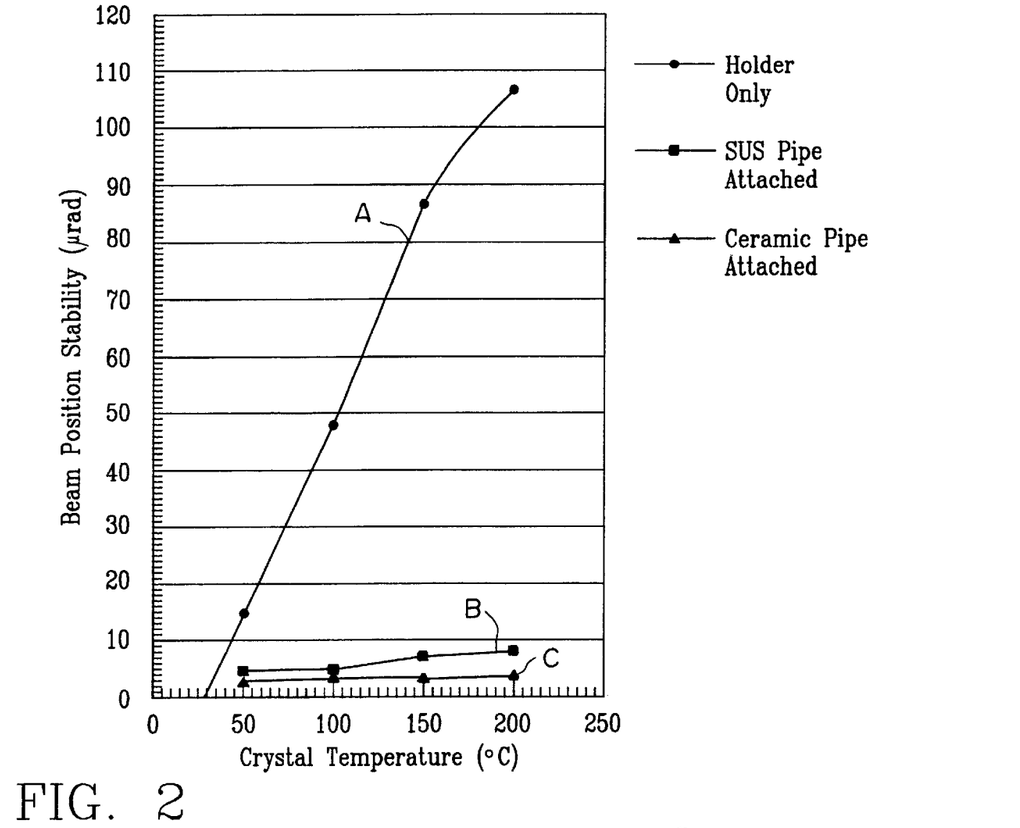
FIG. 2 is a graph of beam pointing stability relative to crystal temperature using a hollow tube.

FIG. 2 shows the results of experiments using stainless steel (SUS) pipe and ceramic pipe as hollow tubes 5, 5'. In the figure, the vertical scale is the beam pointing stability ($\mu$rad) and the horizontal scale is the crystal temperature (° C.); curve A shows results with the holder only, curve B with SUS pipe attached to the holder, and curve C with ceramic pipe attached. As shown in the figure, with the holder alone the beam pointing stability deteriorated as the crystal temperature increased, and when the crystal temperature was 200° C., it deteriorated to 110 $\mu$rad. With hollow tubes 5, 5' attached, on the other hand, even when the crystal temperature reached 200° C., the beam pointing stability was no more than 10 $\mu$rad. This showed that the beam pointing stability could be greatly improved by attaching the hollow tubes 5, 5'. The beam pointing stability was investigated using various other materials such as copper pipe, and it was learned that the beam pointing stability is not greatly influenced by the material of the pipe.

When similar experiments were performed varying the inside diameter of the hollow pipe, there was no deterioration of the beam pointing stability even when the hollow tubes had an inside diameter of 30 mm. The diagonal of the CLBO crystal 1 used in the experiments was about 10 mm, so it was confirmed that there is no deterioration of beam pointing stability even if the inside diameter of the hollow tube is 3 times the length of the diagonal of the CLBO crystal 1.

Next, copper pipes (inside diameter 4.7 mm) of various lengths were attached as hollow tubes 5, 5' and the heater 4 heated the CLBO crystal 1 to given temperatures to investigate the relationship between the length of the copper pipe, the difference between room temperature and the temperature at the tip of the copper pipe and the beam stability. The results had the characteristics shown in FIG. 3. In the drawing, the left vertical scale indicates the beam pointing stability ($\mu$rad), the right vertical scale shows the difference between tip temperature and room temperature (° C.), and the horizontal scale shows length (mm) of the copper pipe; curve A is the temperature difference relative to the length of the copper pipe, and curve B is the beam pointing stability relative to the length of the copper pipe.

Figure 3:
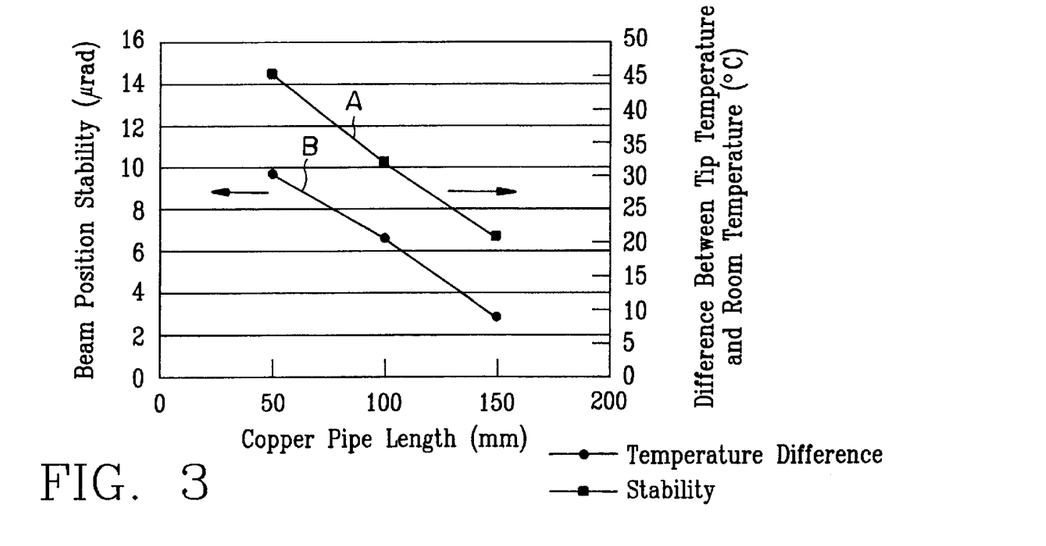
FIG. 3 is a graph of the difference between tip temperature and room temperature and of beam pointing stability relative to length of hollow tube.

As indicated by trace A of the drawing, the longer the copper pipe is, the smaller the temperature difference at the tip of the pipe will be. The beam pointing stability also improves as the length of the copper pipe increases, as shown by trace B.

Figure 4:
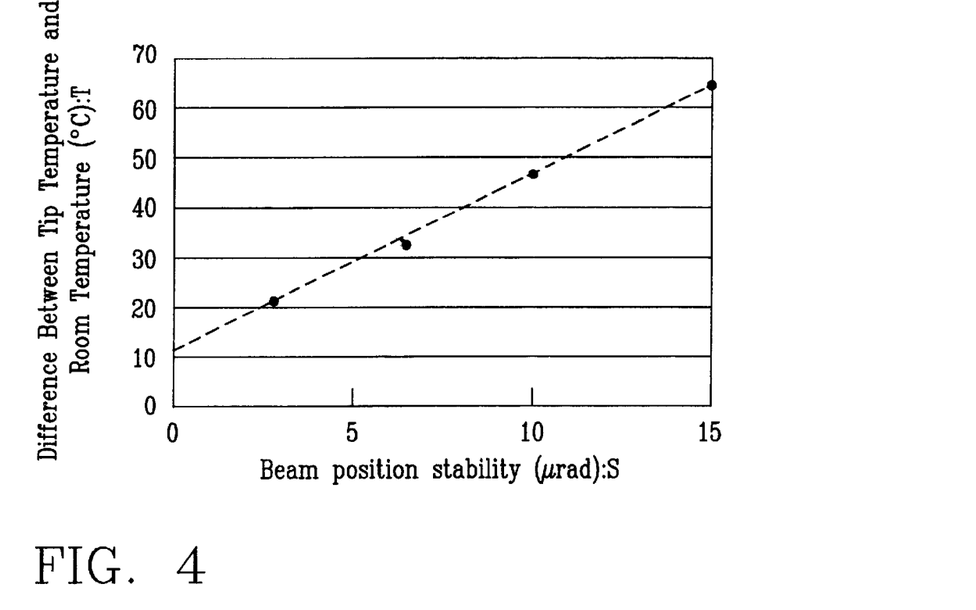
FIG. 4 is a graph of the relationship of beam pointing stability to the difference between tip temperature of hollow tube and room temperature.

FIG. 4 plots the results in FIG. 3 as the relationship between the beam pointing stability and the difference between the temperature at the tip of the pipe and the ambient temperature. The vertical scale is the difference T between the temperature at the tip of the pipe and the ambient temperature, and the horizontal scale shows the beam pointing stability S. From this figure, it can be seen that, in an experiment using copper pipe as the hollow tube, the relationship between the temperature difference T (between the temperature at the tip of the pipe and the ambient temperature) and the beam pointing stability S is T=3.5S+12. In other words, in order to obtain a given beam stability S in this experiment, it is necessary only that the temperature difference T between the crystal temperature and room temperature be in the range T≦3.5S+12.

Now, a similar experiment was carried out using pipes of various materials and varying the crystal temperature and ambient temperature. In this way, it was confirmed that good results could be obtained, even allowing for measurement errors by the thermocouple, if the temperature difference T between the crystal temperature and room temperature were in the relationship T≦3.5S+20. For example, beam fluctuation of no more than 5 μrad could be obtained at T≦37.5° C., or if the difference between the ambient temperature and the temperature at the end of the beam passage component away from the crystal were no more than about 40° C.

Figure 5:
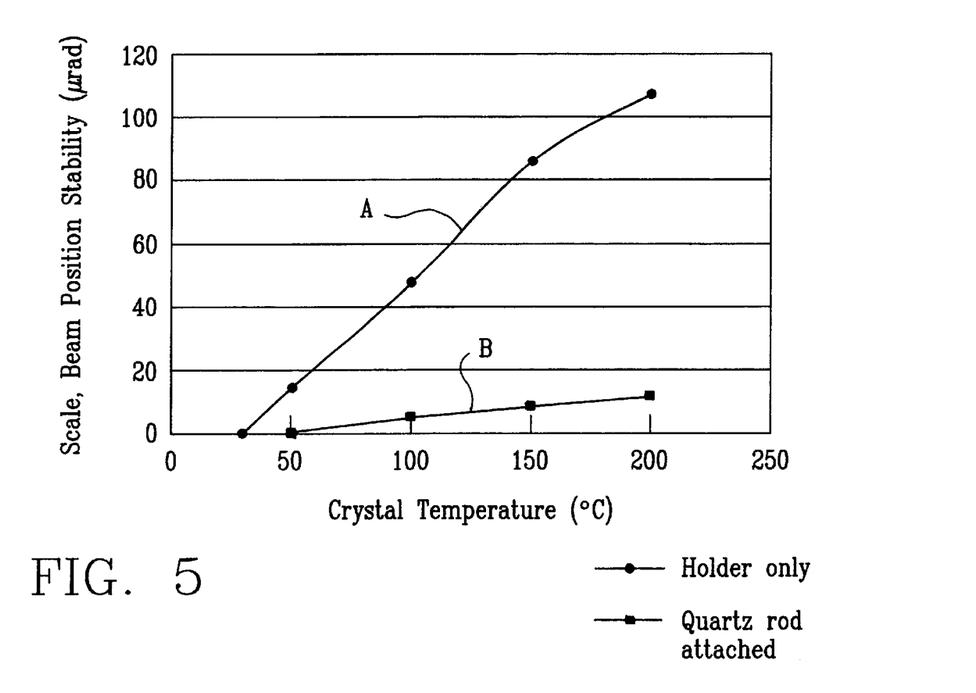
FIG. 5 is a graph of beam pointing stability relative to crystal temperature using a solid tube.

Next, the CLBO crystal was heated by the heater 4 and the beam pointing stability was investigated using a solid quartz rod inside the hollow tubes 5, 5' as the beam passage component, and with the holder alone (without the hollow tubes 5, 5' or the solid quartz rod attached). In this experiment, the quartz rods used were nearly the same length as the hollow tube 1 shown in FIG. 1, and were positioned so that the tip of the quartz rod projected slightly beyond the tip of the hollow tubes 5, 5'. The results are shown in FIG. 5. In the drawing, the vertical scale indicates beam pointing stability (μrad) and the horizontal scale shows the CLBO crystal temperature (° C.); curve A indicates the holder only and curve B is with the quartz rod attached. As shown in the Figure, it was confirmed that the beam pointing stability can be greatly improved by using a quartz rod as the beam passage component.

Now, FIG. 1 illustrates a case where both ends of the hollow tubes 5, 5' are open. It is possible, however, either to have both ends of the hollow tubes 5, 5' open or to place windows of quartz or other material that is highly transparent to the wavelengths involved in the wavelength conversion at the points where the hollow tubes 5, 5' attach to the holder 3, thus sealing off the space enclosed by the holder 3, the crystal supporter 2 and the hollow tubes 5, 5', or the space enclosed by the holder 3 and the crystal supporter 2. In such a structure, it is possible to maintain a vacuum in the space described, and to reliably prevent beam fluctuation within the holder 3 or within the hollow tubes 5, 5'.

Other structures implementing the crystal support device covered by this invention are explained below.

Figure 6:
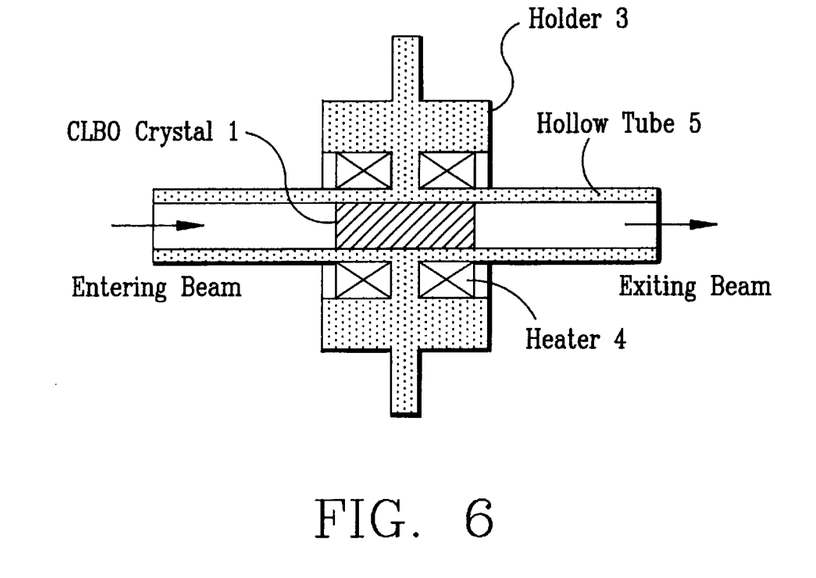
FIG. 6 is a cross-sectional view of the structure of a crystal support device with unified hollow tube and crystal supporter.

(1) Crystal support device with hollow tubes and crystal supporter in unitary structure FIG. 6 is a drawing of structure of a crystal support device with unified hollow tube and crystal supporter. In the FIGS. 3 is a holder made of a ceramic or other material 3; a hollow tube 5 encloses a CLBO crystal 1, and the CLBO crystal 1 is held in place so that it does not move within the hollow tube 5. A heater 4 is placed on the outer periphery of the hollow tube 5, to which a thermocouple (not illustrated) is also attached. The two end faces of the CLBO crystal connect to the outside through the hollow tube 5. A laser beam emitted by a laser source (not shown) passes through the hollow tube 5 and enters one face of the CLBO crystal, and the beam that exits the other side of the CLBO crystal passes through the hollow tube 5 and is emitted to the outside.

By means of this structure it is possible to unify the hollow tube 5 and the holder into a single piece, thus enabling simplification of the structure. If the holder 3 and the hollow tube 5 are divided right and left with respect to a centerline (shown by the broken line in FIG. 6), it becomes easier to insert or replace the CLBO crystal, or to change the direction of the crystal axes of the CLBO crystal.

Figure 7:
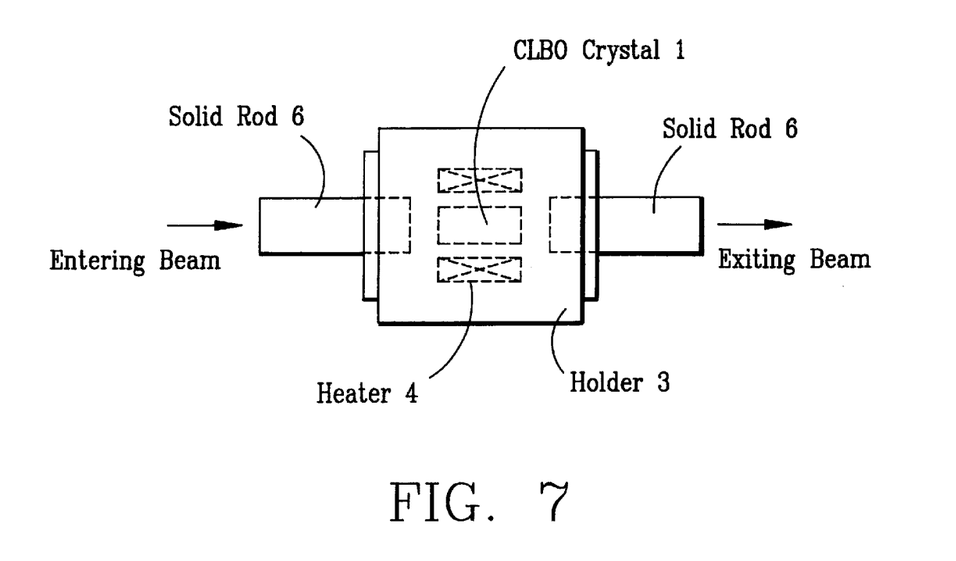
FIG. 7 shows the structure of a crystal support device using a solid tube for beam passage component.

(2) Crystal support device using a quartz rod or similar material as the beam passage component FIG. 7 shows the structure of a crystal support device using a solid tube as the beam passage component conveyance. In the drawing, a CLBO crystal 1, a solid rod 6 of quartz or a similar material, and a holder 3 formed of, for example, a ceramic are shown. The holder 3 has the same structure as in FIG. 1, and encloses a heater as described above.

The solid rod 6 is made of a material that is highly transparent to the wavelengths involved in the wavelength conversion, such as a quartz rod or, for example, $CaF_2$, $MgF_2$ or LBO crystal. Now, it is desirable that the diameter of the solid tube 6 be at least twice the beam diameter (e fluctuation) described above.

In FIG. 7, if there is a space between the face of the CLBO crystal 1 and the end of the solid rod 6, or beam passage component that is closest to the CLBO crystal, that space is covered entirely by a cover (in this case, the holder 3). In that way, it is possible to effectively prevent the occurrence of convection in that space, and thus, to prevent beam fluctuation within that space.

(3) Crystal support device with cooling apparatus on the tips of the beam passage components In the experiments described above, attempts were made to vary the difference between room temperature and the temperature at the tip of the hollow tube by selecting the length of the hollow tube. However, it is also effective to attach a cooling apparatus to the tip of the hollow tube or solid rod and to cool the beam passage component that comprises the hollow tube or solid rod to a temperature that is nearer to the ambient temperature.

Figure 8A:
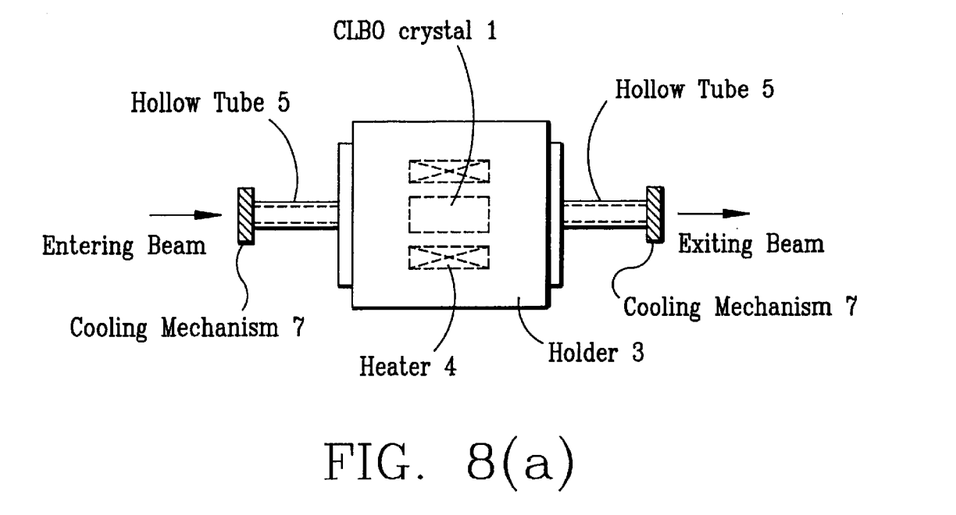
FIGS. 8(a) and 8(b) show the structure of a crystal support device having a cooling mechanism attached to the tip of a hollow tube or solid tube.
Figure 8B:
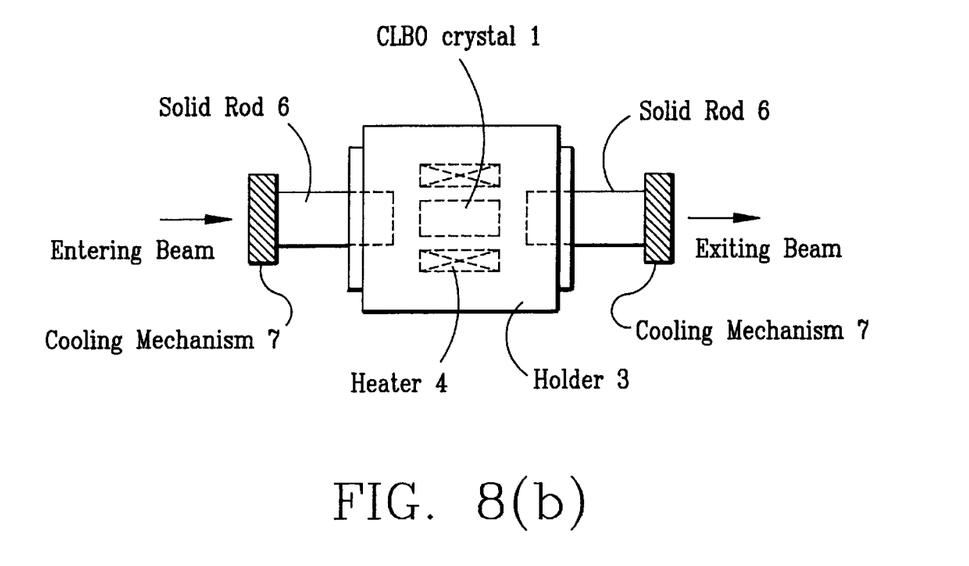

FIGS. 8(a) & 8(b) show the structure of a crystal support device using a cooling mechanism attached to the tip of a hollow tube or solid rod. FIG. 8(a) shows a cooling mechanism attached to the tip of a hollow tube, and FIG. 8(b) shows a cooling mechanism attached to the tip of a solid tube. Now, FIG. 8(a) shows that a relatively narrow tube is used in the case of a hollow tube.

In FIGS. 8(a) and 8(b) 1 is a CLBO crystal, 5 is a hollow tube, 6 is a solid tube, and 3 is a holder made of a ceramic or other material. The structure of the holder 3 is like that in FIG. 1, and a heater 4 is enclosed within it. Moreover, a cooling mechanism 7 that, such as cooling fins, is attached to the tip of the hollow tube 5 or solid rod 6, or a mechanism capable of liquid cooling, or a cooling mechanism that uses a Peltier element, or other such mechanisms can be used. By placing such a cooling mechanism on the tip of the hollow tube 5 or the solid tube 6, it is possible to reduce the length of the hollow tube 5 or the solid rod 6 and still cool the tip to a temperature closer to room temperature, thus giving the crystal support device a more compact structure.

(4) Crystal support device using bellows as the hollow tube

Figure 9:
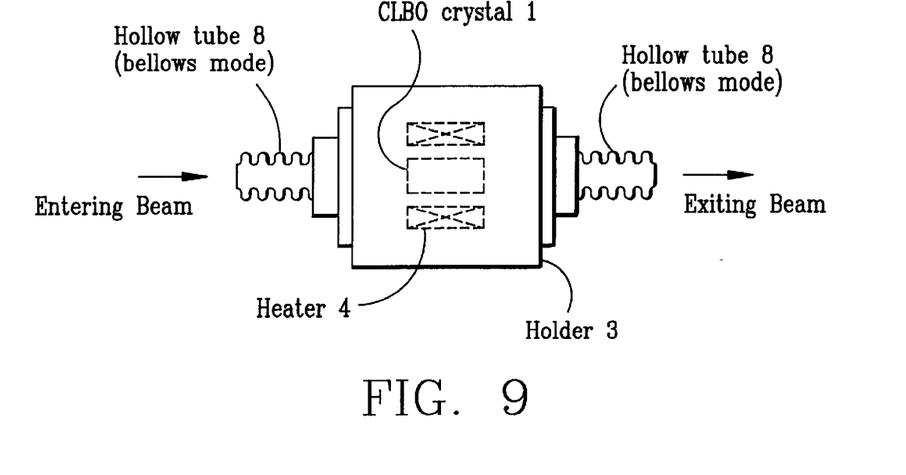
FIG. 9 shows a crystal support device with a bellows type of hollow tube.

FIG. 9 is a drawing of the structure of a crystal support device with a bellows type of hollow tube. In the figure, 1 is a CLBO crystal, 8 is a hollow tube formed by a cylindrical bellows of thin metal, and 3 is the holder. The structure of the holder 3 is like that in FIG. 1, and a heater 4 is enclosed within it.

As shown in the figure, use of the bellows type of hollow tube 8 makes it possible to enhance the cooling effect on the air within the hollow tube, and thus, to effectively control beam fluctuation at the tip of the hollow tube. In addition, the bellows type of hollow tube is flexible, and so it is effective for doing fine adjustments of the angle of the nonlinear crystal and adjusting to with the phase matching angle.

Action of the Invention

As explained above, this invention establishes a beam passage component at the beam entrance and exit sides of the nonlinear optical crystal in the crystal support device, and controls the temperature at the end of the beam passage component away from the crystal within a range of difference from ambient temperature at which the beam will be stable. In this way, it enables high-precision processing by means of laser beams.

We claim:

1. A crystal support device comprising a nonlinear optical crystal, a supporter for said crystal, and a holder that encloses the supporter and includes a temperature control mechanism to control the temperature of the crystal, beam passage components on entering and exiting sides of the crystal, wherein temperature control mechanism comprises means for regulating the temperature of an end of each beam passage component that is furthest from the crystal to a temperature, relative to ambient temperature, at which beam fluctuation will be effectively prevented, wherein said means for regulating controls the temperature of the ends of the beam passage components which are furthest from the crystal temperature in accordance with the relationship $T \leq 20 + 3.5S$ where $T$ is a difference between the ambient temperature and the temperature of the ends of the beam passage components which are furthest from the crystal, on both the entering and exiting sides of the crystal, and where $S$ is the required maximum beam fluctuation in $\mu$rad.

2. A crystal support device as in claim 1, wherein said beam passage components are hollow tubes.

3. A crystal support device as in claim 2, wherein a minimum diameter of the beam passage components is greater than twice a diameter of a beam of light to be passed therethrough, in use, and a maximum diameter of the beam passage components is at most 3 times a diagonal of the crystal.

4. A crystal support device as in claim 1, wherein the beam passage components are made of a solid material that is transparent to a beam of light to be passed therethrough, in use.

5. A crystal support device as in claim 1, wherein a space is provided between end faces of the crystal and facing end faces of the beam passage components; and wherein the crystal is provided with a cover that precludes convection within said space.

6. A crystal support device as in claim 5, wherein a vacuum exists in said space.

7. A crystal support device as in claim 6, wherein said beam passage components are hollow tubes.

8. A crystal support device as in claim 6, wherein the beam passage components are made of a solid material that is transparent to a beam of light to be passed therethrough, in use.

\* \* \* \* \*